3,000,725
METALLURGICAL CONCENTRATION OF MANGANESE
Karl Helge Sigfrid Löfquist, Filipstad, Sweden, assignor to Tholand, Inc., New York, N.Y., a corporation of New York
No Drawing. Filed Feb. 27, 1958, Ser. No. 717,828
Claims priority, application Germany June 29, 1956
5 Claims. (Cl. 75—30)

This invention relates to the production of ferrous alloys containing a high proportion of manganese and more particularly to a method for increasing the manganese content of ferrous materials having a relatively low manganese content. The invention is especially useful when employed in connection with the production of ferro-manganese from manganese-bearing open hearth slags and will be illustratively described as used for this purpose. However, as the description proceeds it will become apparent that the invention can also be used to advantage where it is desired to increase the manganese content of other types of manganese-bearing materials.

It is known that open hearth slags contain substantial amounts of manganese and numerous efforts have been made to develop a satisfactory process for recovering this manganese in useful form. As a first step in the recovery process the slag is commonly reduced in a blast furnace to yield a spiegeleisen which typically contains from 10% to 25% manganese, 80% to 65% iron and small amounts of other constituents. The manganese content of this spiegeleisen can be increased by selective oxidation of the metal in molten form to produce a slag wherein the manganese-iron ratio is substantially increased. By proper control of the oxidizing conditions slags can be obtained which contain upwards of 60% manganese and only a few percent of iron.

However, the slags thus produced contain a large proportion of manganese oxide which has a relatively high melting point (1750° C.) and are thus more or less refractory and viscous. This high viscosity is objectionable because it causes the slag to entrap granules containing iron, phosphorous and other substances not desired in the manganese concentrate.

In order to achieve a more fluid slag it has been proposed that the molten spiegeleisen be treated with both oxygen and sulfur to form a mixture of oxides and sulfides having a relatively low melting point. Thus in an article in "Metallurgia" (December 1947, page 115) it is suggested that mixtures of sulfur dioxide and pyrites or air and pyrites be blown through the spiegeleisen melt to form a slag containing both oxides and sulfides. The principal constituents of such slag are manganese sulfide and manganese oxide and the eutectic mixture of these two compounds contains approximately equal weights of the two compounds, which corresponds to a molar ratio of MnO:MnS of 1.2:1. Thus optimum results are obtained by treating the melt with the proper relative amounts of oxygen and sulfur to yield a slag containing an MnO:MnS molar ratio of approximately 1.2:1. In this way it is possible to obtain slags melting as low as 1350° to 1440° C.

It has now been found that a fluid slag can be achieved by using, under the controlled conditions outlined below, a ferrous metal sulfate such as iron sulfate or manganese sulfate in place of the oxygen- and sulfur-containing materials that have been previously proposed. Ferrous sulfate is produced as an incident of the various pickling operations carried out in connection with the manufacture of steel products and hence it is normally produced as a waste product in steel manufacture. The accumulation of ferrous sulfate from this source presents a serious disposal problem since it cannot be discharged into rivers or stored on the ground. Moreover the market demand for ferrous sulfate is small. Hence the use of ferrous sulfate in the present process not only alleviates a difficult disposal problem, but also provides a substantial economic advantage over the sulfur-bearing materials previously proposed such as pyrites which must be purchased especially for use in the process.

As pointed out above optimum results in terms of slag fluidity are obtained when the quantities of reactive oxygen and reactive sulfur used are in a molar ratio of about 1.2:1. Since the oxygen-sulfur ratio in ferrous metal sulfates is 4:1, it is evident that these sulfates by themselves do not satisfy the requirements for the production of a fluid slag. However, it has been found that by treating with ferrous metal sulfates a melt containing a relatively small controlled amount of silicon an acceptable slag fluidity can be achieved. The silicon is oxidized by a part of the oxygen from the sulfate and the MnO:MnS ratio is thereby shifted substantially closer to the eutectic value than it would be if no silicon were included in the melt. Also the silica formed lowers the melting point of the slag in that a relatively fusible $MnO:MnS:SiO_2$ slag is formed.

The concentration of silicon in the melt appears to be quite critical. If the silicon concentration is less than about 1% by weight, the MnO:MnS ratio in the slag is too high to give an acceptably fluid slag. If on the other hand the silicon concentration in the melt is greater than about 3% an excessive amount of silica is formed which produces an undesirably high silicon concentration in the final product, i.e. the ferro-manganese alloy. Thus the silicon content of the spiegeleisen melt to be treated should desirably be between 1% and 3% by weight.

Spiegeleisen normally contains some silicon, and if the silicon concentration of the spiegeleisen as received is within the range 1% to 3%, then of course no adjustment of the silicon concentration is required prior to treatment of the melt with the ferrous metal sulfate. If the silicon content of the spiegeleisen is found to be too low it may be increased by reducing more of it from the burden in the spiegeleisen furnace, or ferro silicon can be added to increase the silicon concentration to the desired value as set forth above.

The ferrous metal sulfate is desirably added to the melt below the surface thereof. Ferrous sulfate decomposes at about 500° to 600° C. to form ferrous oxide (FeO) and sulfur trioxide ($SO_3$), and manganese sulfate decomposes at a somewhat higher temperature. If the ferrous metal sulfate is added to the top of the melt, the sulfur trioxide gas formed escapes without reacting with the constituents of the melt. Hence the ferrous metal sulfate is desirably introduced near the bottom of the melt, or at least well below the surface of the melt, so that the decomposition products have an opportunity to react with the melt ingredients.

The amount of ferrous metal sulfate used will of course vary with the composition of the spiegeleisen. In general the amount of ferrous sulfate used should be somewhat less than that required to convert all of the manganese in the melt to MnO and MnS. The ferrous sulfide formed as an incident of the reaction is soluble to some extent in the melt, and it is usually desirable that this dissolved FeS be kept as low as possible. The solubility of FeS in the melt is reduced by the presence of manganese in the melt and accordingly the quantity of ferrous sulfate used is preferably limited in such manner as to leave say 3% to 4% manganese in the melt. At this manganese concentration the dissolved FeS is only about 0.07%.

Thus the quantity of ferrous sulfate desirably used is the amount stoichiometrically required to react with all of the silicon and say 65% to 95% of the manganese in the melt. Upon completion of the reaction the melt may typically contain about 3% Mn, zero % Si, 3% C and substantially all of the phosphorous originally present.

In order to point out more fully the nature of the present invention the following specific example is given of an illustrative embodiment of the invention.

An electric furnace is charged with 500 pounds of spiegeleisen having the following composition: manganese=22%; silicon=1%; carbon=4%; phosphorous= 2-3%; the balance being iron. The charge is melted in the furnace and the furnace is brought to and maintained at the temperature of approximately 1400° C. Approximately 70 pounds of finely divided ferrous sulfate having a particle size of about 0.1-1 mm. is fed to the furnace over a period of about 15 minutes through a number of spaced tubes mounted in the furnace wall near the bottom of the furnace. Upon completion of the addition of the ferrous sulfate the slag and the iron melt are tapped at about 1420° C. The reactions between the manganese, silicon and ferrous sulfate that occur within the melt may be represented by the following equations:

(1) $2FeSO_4 = 2FeO + 2SO_3$
(2) $Si + 2FeO = SiO_2 + 2Fe$
(3) $8Mn + 2SO_3 = 6MnO + 2MnS$

The slag formed as a result of the treatment of the melt with ferrous sulfate has a melting point of about 1350° C. and its composition is approximately as follows: Fe=2%-4%; Mn=58%-60%; S=8%; $SiO_2$=8-12%; 16%-24% =oxygen and minor constituents. The pig-iron melt underneath the slag contains about 3-4% Mn. Thus approximately 85% of the 22% manganese originally present in the melt is transferred to the slag.

Upon completion of the reactions described above the slag is separated from the molten metal and treated in accordance with known procedures to produce a ferromanganese alloy containing a high percentage of manganese. For example, the slag may be subjected to an oxidizing roast in a sinterplant in order to oxidize the S-content to $SO_2$, which is recovered in some form giving, for instance, a certain amount of $H_2SO_4$. In this way the sulfur used in the process may be recovered in the same form as it is used in the pickling tanks.

An oxidized product is obtained containing say 60% Mn 3-5% Fe and 8-12% $SiO_2$. This product can be reduced by known methods to yield ferro-manganese containing about 80% manganese.

It is of course to be understood that the foregoing description is illustrative and that numerous changes may be made in the procedure described without departing from the spirit of the invention as defined in the appended claims.

I claim:
1. A process for concentrating manganese of an alloy essentially composed of a major proportion of iron, said alloy containing at least 10% by weight of manganese, which comprises establishing a melt of said alloy containing from 1% to 3% by weight of silicon and introducing into said melt below the surface thereof a finely divided ferrous metal sulfate to produce a relatively fluid slag which is composed predominantly of manganese oxide and manganese sulfide with a small amount of silica.

2. A process for concentrating manganese of an alloy essentially composed of a major proportion of iron, said alloy containing at least 10% by weight of manganese, which comprises establishing a melt of said alloy containing from 1% to 3% by weight of silicon and introducing into said melt below the surface thereof finely divided manganese sulfate to produce a relatively fluid slag which is composed predominantly of manganese oxide and manganese sulfide with a small amount of silica.

3. A process for concentrating the manganese of an alloy essentially composed of a major proportion of iron and at least 10% by weight of manganese which comprises establishing a melt of said alloy containing from 1% to 3% by weight of silicon and introducing into said melt below the surface thereof finely divided ferrous sulfate to produce a relatively fluid slag which is composed predominantly of manganese oxide and manganese sulfide associated with a minor amount of silica.

4. A process for concentrating the manganese content of spiegeleisen which comprises, establishing a melt of said spiegeleisen containing from 1% to 3% by weight of silicon and introducing into said melt below the surface thereof finely divided ferrous sulfate to produce a relatively fluid slag which is composed predominantly of manganese oxide and manganese sulfide associated with a minor amount of silica.

5. A process according to claim 4 and wherein the quantity of ferrous sulfate added to the melt is approximately the amount stoichiometrically required to react with the silicon and 65% to 95% of the manganese therein.

References Cited in the file of this patent
UNITED STATES PATENTS

| 34,937 | Bradley | Apr. 15, 1862 |
| 238,749 | Siegfried | Mar. 8, 1881 |
| 1,927,240 | Lofquist | Sept. 19, 1933 |

OTHER REFERENCES

Metallurgia, December 1947, page 115. Published by the Kennedy Press Limited, Manchester, England.

Stoughton: "Metallurgy of Iron and Steel," 3rd ed., 2nd Impression; published by McGraw-Hill Book Co., Inc., New York (1923). (Pages 7 and 353 relied on.)